United States Patent
Vogel

(10) Patent No.: US 11,509,469 B2
(45) Date of Patent: Nov. 22, 2022

(54) METHODS AND SYSTEMS FOR PASSWORD RECOVERY BASED ON USER LOCATION

(71) Applicant: Reynold Vogel, Inc., Portland, OR (US)

(72) Inventor: Matthew Vogel, Portland, OR (US)

(73) Assignee: Reynold Vogel, Inc., Portland, OR (US)

( * ) Notice: Subject to any disclaimer, the term of this patent is extended or adjusted under 35 U.S.C. 154(b) by 114 days.

(21) Appl. No.: 17/186,999

(22) Filed: Feb. 26, 2021

(65) Prior Publication Data

US 2021/0273801 A1 Sep. 2, 2021

Related U.S. Application Data

(60) Provisional application No. 62/983,376, filed on Feb. 28, 2020.

(51) Int. Cl.
| | |
|---|---|
| *H04L 9/08* | (2006.01) |
| *H04L 9/32* | (2006.01) |
| *H04L 9/06* | (2006.01) |
| *H04L 9/14* | (2006.01) |

(52) U.S. Cl.
CPC ......... *H04L 9/0894* (2013.01); *H04L 9/0643* (2013.01); *H04L 9/0863* (2013.01); *H04L 9/0872* (2013.01); *H04L 9/14* (2013.01); *H04L 9/3242* (2013.01)

(58) Field of Classification Search
CPC ....... H04L 9/08; H04L 9/0894; H04L 9/0872; H04L 9/0861; H04L 9/06; H04L 9/0634; H04L 9/0863; H04L 9/14; H04L 9/32; H04L 9/3243; H04L 63/06
See application file for complete search history.

(56) References Cited

U.S. PATENT DOCUMENTS

| | | | |
|---|---|---|---|
| 10,778,428 B1 * | 9/2020 | Wang | H04L 9/50 |
| 2012/0260325 A1 * | 10/2012 | Malpani | H04W 12/068 |
| | | | 726/6 |
| 2014/0082369 A1 * | 3/2014 | Waclawsky | G06F 21/62 |
| | | | 713/189 |
| 2015/0058640 A1 * | 2/2015 | Balakrishnan | H04L 9/3236 |
| | | | 713/193 |
| 2021/0194702 A1 * | 6/2021 | Roscoe | H04L 9/3221 |

* cited by examiner

*Primary Examiner* — Shaqueal D Wade-Wright
(74) *Attorney, Agent, or Firm* — Chernoff, Vilhauer, McClung & Stenzel, LLP

(57) ABSTRACT

A secure method and/or system allowing a user to import, export, recover and use their private keys based in part on the user's location information, to allow for reliable, consistent, and easy management of user identity and private keys across all of a user's devices and eliminate of traditional username/password authentication schemes.

17 Claims, 6 Drawing Sheets

METHODS AND SYSTEMS FOR PASSWORD RECOVERY BASED ON USER LOCATION

BACKGROUND OF THE INVENTION

The present invention is directed to a method and system for the recovery of cryptographic assets involving loss of a private key. This invention may be implemented in traditional technologies that utilize both usernames and passwords together, as well as systems utilizing public key and private key cryptography to identify users, such as cryptocurrency or blockchain technology.

In modern digital transactions involving the use of public and/or private key cryptography, the two types of keys serve different purposes. A private key is typically used to digitally sign communication, while a public key is used to verify signatures without the presence of the corresponding private key. Maintaining the secrecy of the private key is critical because anyone with knowledge of the private key may use the key to sign further communication.

Generally, users of software with traditional username and password authentication schemes do not have their own private key. Instead, after the user provides an application with proper credentials, the server will provide the client with a temporary password, commonly referred to as a session identifier, stored in a cookie, that is then used to associate further communication with the user record associated with the credentials originally provided.

In instances where users are actually provided their own private key, such as in the area of ledger technology (i.e., blockchain), there are abundant issues surrounding the loss of the private keys by users, given that private keys are hard to remember and burdensome to manage. In this area, the private key is referred to as the "wallet seed" of a cryptocurrency wallet. A combination of both allows a user to spend the currency stored in the wallet. While a number of methods have been proposed to combat the loss of private keys, all of these methods have severe limitations. For instance, biometric data does not offer the strongest protection, given that a user may unconsciously leave his or her biometric data such as DNA, fingerprints everywhere and be easily susceptible to an imposter's attack.

What is desired, therefore, is a secure method and/or system allowing a user to import, export, recover and use their private keys, which would lead to elimination of traditional username/password authentication schemes, and allow reliable, consistent, and easy management of user identity across all of a user's devices.

BRIEF DESCRIPTION OF THE SEVERAL DRAWINGS

For a better understanding of the invention, and to show how the same may be carried into effect, reference will now be made, by way of example to the accompanying drawings, which:

DETAILED DESCRIPTION OF PREFERRED EMBODIMENTS

Figure 1:
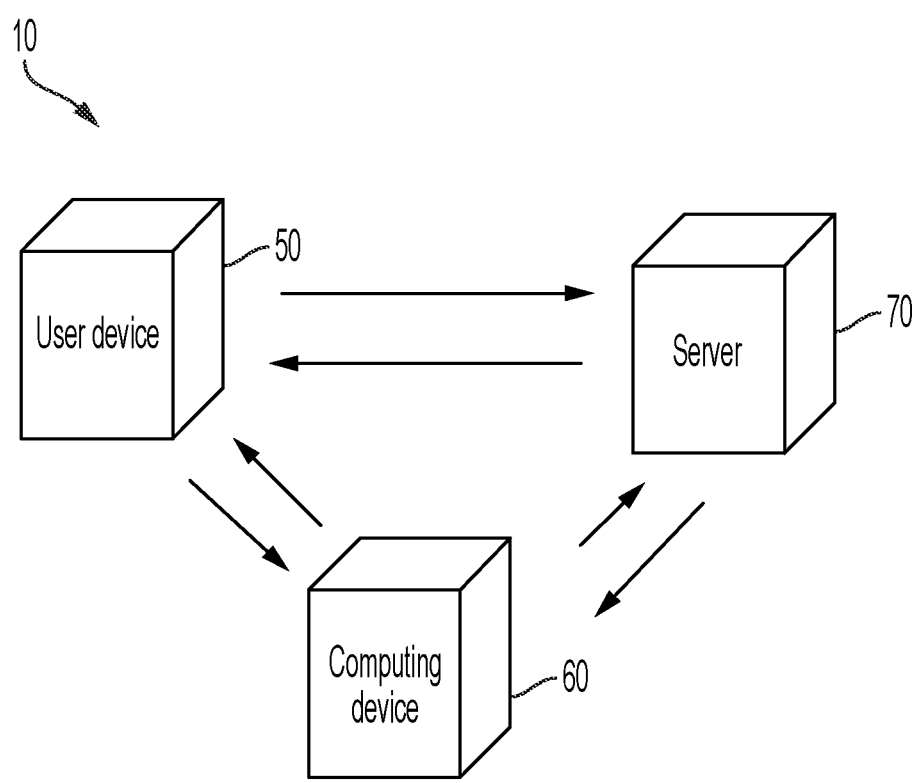
FIG. 1 illustrates a communication system according to one embodiment of the invention.

FIG. 1 of the accompanying drawings illustrates a communication system 10 which includes a first user device 50, a computing device 60, and a server 70. The devices themselves may also have nodes, which serve as a communication or distribution point between each of the devices. In some embodiments, the system 100 may also include communication channels over which the devices may communicate with each other. The communication channels may be public, secure, or have additional features. Further, each device may also possess information about the other device without direct communication.

The user device 50 in the communication system 10 serves to initiate communication with the computing device 60. The user device 50 selects parameters obtained from the coordinates of the user's secret location to allow for the user device to generate the encryption key and relationship identifier. The user device 50 may include additional devices and components that enable the detection of the user device's location, e.g., a GPS device. In some embodiments, the user device and computing device 60 may exchange information such as user identification, device identification, and signed communication.

In some other embodiments, the system may include user devices with separate functionalities (e.g., a near field communication device, an identity device) in addition to a device (such as a smartphone) such that, after the computing device 60 generates the encryption key and relationship identifier, different portions of the private keys may be transmitted from the computing device back to the respective user devices. In some instances, the smartphone may not store the generated private keys for increased security. In other words, the user devices may be configured so that only a portion of the private key is stored on the respective user devices, and in the event one of these user devices are stolen, only a portion of the private key may be obtained.

In other embodiments, the communication system 10 may have additional devices or nodes. The system may also be applicable to a variety of technologies, such as ledger and mobile technology, and are not limited to a specific application. In some embodiments, the user device 50 and the computing device 60 may be implemented in a singular device such as computers, laptops, tablet computers, mobile phones, smartphones, and processors. There may be additional computing devices and/or servers connected to the computing device 60 and user device 50.

Figure 2:
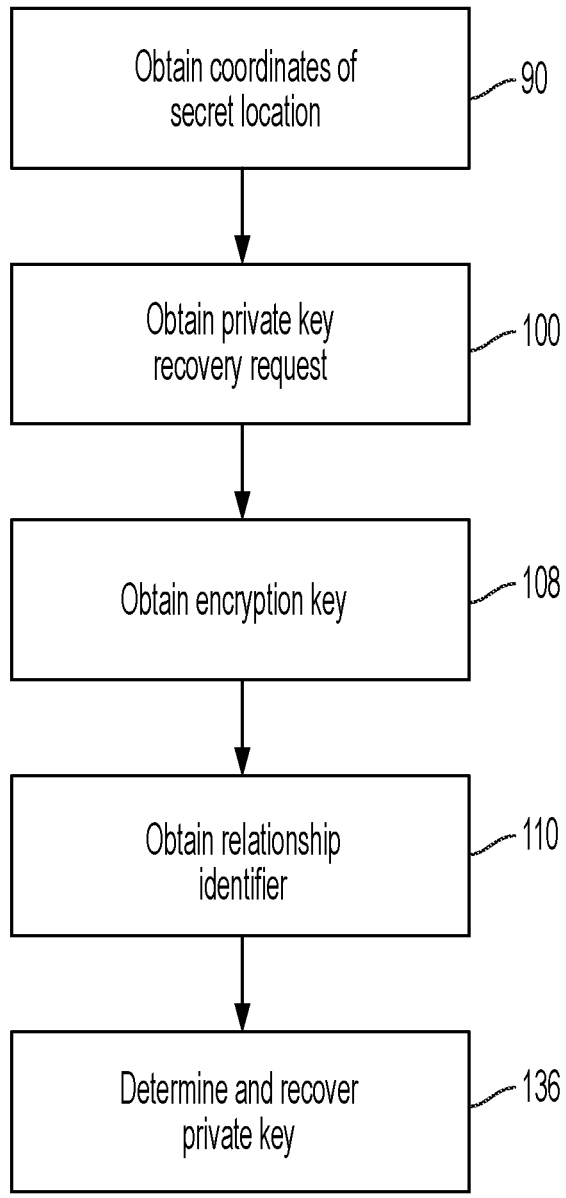
FIG. 2 is a flowchart demonstrating the overarching method of generating and recovering private keys.
Figure 3:
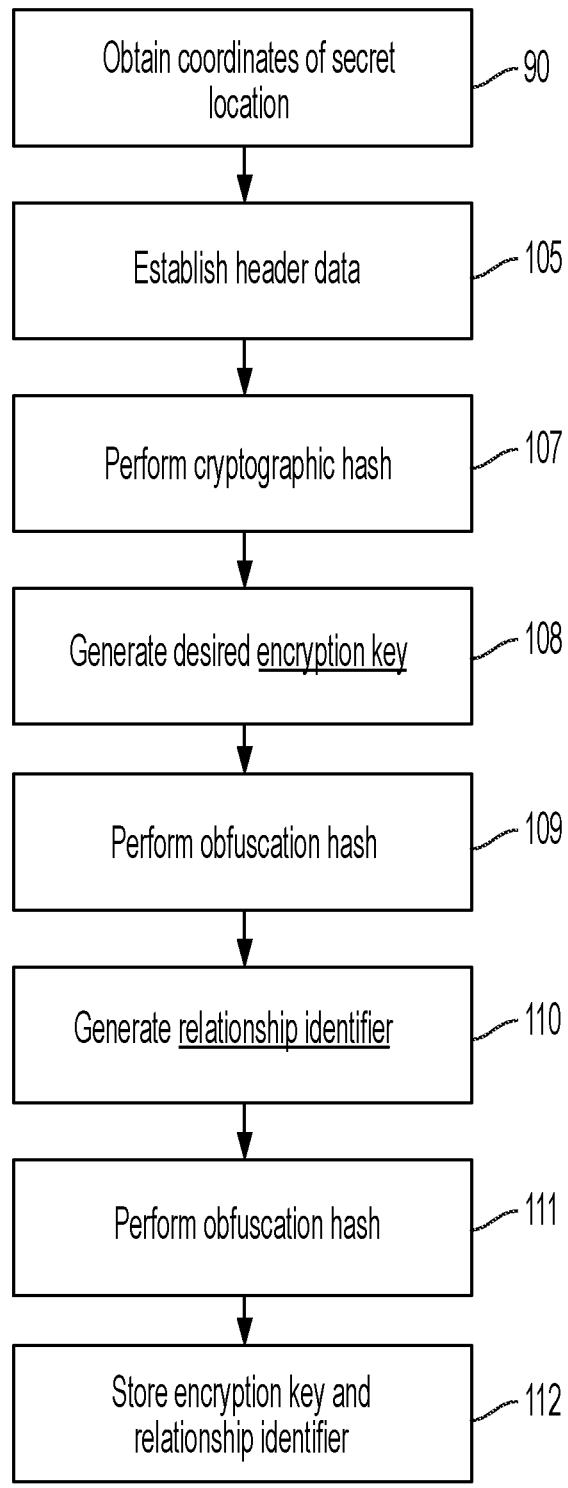
FIG. 3 is a flowchart demonstrating the method of generating an encryption key and relationship identifier.
Figure 4:
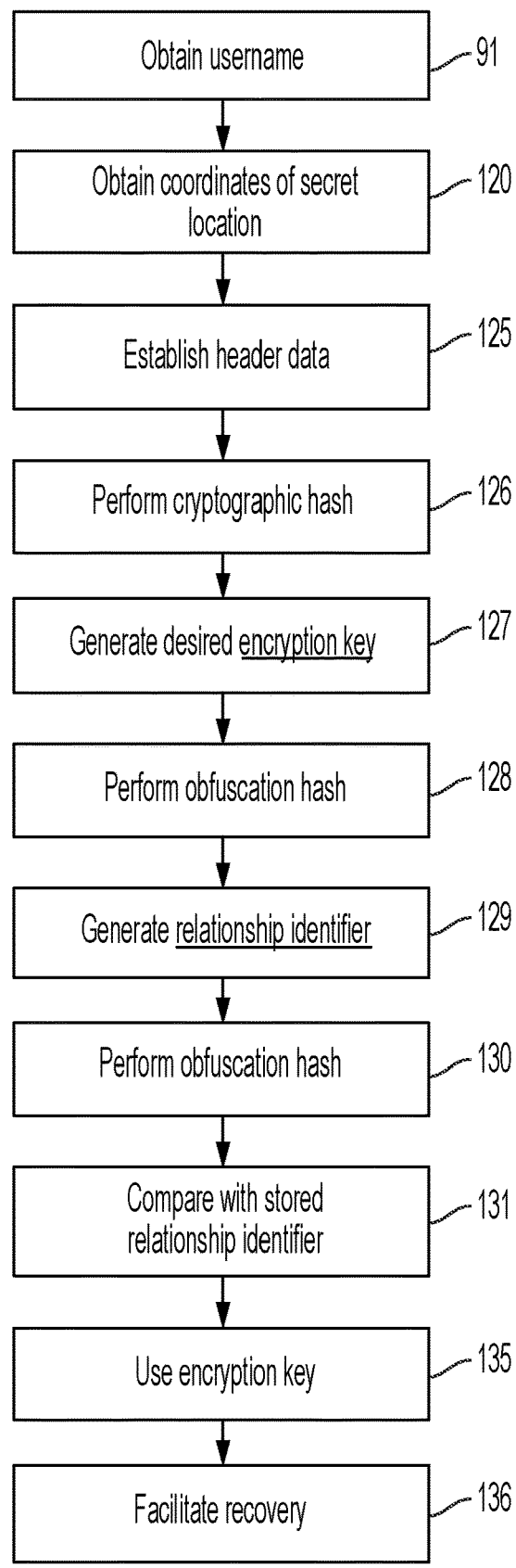
FIG. 4 is a flowchart demonstrating the method of comparing the relationship identifiers and recovering the private keys.

FIG. 2-4 illustrates an embodiment of the method of generating and recovering private keys that may be executed by the communication system illustrated in FIG. 1. Referring to FIGS. 2-4, a user-selected location, such as in the form of geographic coordinates, are first obtained (step 90). Subsequently, the user device 50 together with the computing device 60 establish the "header data," which includes a concatenation of the latitude, longitude, and username values (step 105). For example, the geographic coordinates 45.548097, −122.433365, and username of "userofyadacoin" would render header data equal to "45.548097−122.433365userofyadacoin".

Upon obtaining the information, the computing device 60 in steps 107 and 108 then uses a hashing function to produce a one-way cryptographic hash repeatedly until the value of the hash is below a desired value. The desired value may be determined by the computing device 60 and set as a parameter. In other embodiments, this process can also be applied to the cryptocurrency realm, similar to the process of "mining." The two steps 107, 108 in the method conduct a first hash of the header data to ultimately generate a value below the target. When the desired value is located, the computing device 60 performs one final hash for obfuscation purposes to generate the encryption private key (step 108).

As mentioned, there may be additional computing devices that assist in this step. The steps of 109 and 110 then conduct a second hash below the target, plus one final hash for obfuscation purposes to generate the relationship identifier. The relationship identifier may also be used as a lookup during recovery. In some embodiments, the hash functions may be programmed into the computing device 60.

The steps of 107, 108, 190, 110 and 111 are described in the illustrated embodiment below, where the resulting hash is repeatedly rehashed in a loop used to for finding the encryption key and the relationship identifier is as follows:

1. Set the target=0x00000ffffffffffffffffffffffffffffffffffffffffffffffffffffffff;
2. Loop starts;
3. Hash below the target found;
   (e.g., 0x000001b979f572871f1c3466e8418bc3a68d4af4dc43490c14e8221babf3c1e7)
4. One more hash for obfuscation;
   (e.g., encryption_key=0xe1c1f92143dea0b0c93dfe89030a9bea8c138bcd38504dd19acdfd81e14f95bc)
5. Loop continues;
6. Hash below the target found;
   (e.g., 0x0000019ed02ef1f65f0349a9515f5dd612210f639f78f728ed7744f6e69db476)
7. One more hash for obfuscation;
   (e.g., relationship_id=0x5ed55bf168817de7729ab94f84de722e0c073eb7bae78d5d056edbd42b7ec96c)

In step 111, after the obfuscation hash is completed by the computing device 60, the computing device may transmit the obtained encryption key, and the relationship identifier to a server, or a network device 70 for storage. In some embodiments, the computing device 60 may be configured to cause selected private keys to be shared with the network device. In some embodiments, the private keys or a portion thereof may also be sent from the computing device 60 to a user device 50, or additional user devices.

Referring to FIG. 4, the user may recover the private key by providing the coordinates of the user-selected location to the user device 50. In this embodiment, the user device 50 obtains the previously selected username (step 91). The user device 50 may then obtain location information of the user, in the form of geographical coordinates of their current location (step 120). The location information may be obtained either by directly inputting map information or by the user's going to the secret location. Similar to the steps of generating private keys as shown in FIG. 3, the subsequent steps 125-130 in the recovery process involves the user device 50 and the computing device 60 establishing header data (step 125), and executing the mining loop to find the two needed values of the encryption key (step 127) and relationship identifier (step 129), followed by an obfuscation hash after each value is generated (steps 128 and 130).

In step 131, the generated relationship identifier is then transmitted to the server or node of a database or blockchain that stores and contains this relationship identifier referencing the encrypted private keys. Subsequently, in step 135 the computing device receives the relationship identifier from the database, server, or network device 70, and compares the two relationship identifiers. If there is a match between the two relationship identifiers, the computing device then applies a decryption function to the first and/or second relationship identifier and subsequently applies the decryption function using the first and second encryption keys to facilitate the recovery of the private key (step 136). The user device then receives the recovered private key. In some embodiments using ledger technology, this private key is then consumed by the wallet application and used to restore the user's wallet.

Compared to traditional user password schemes, utilization of this method to retrieve private keys through location coordinates provides much greater security, considering the components of header data are much more complex, as the header data may include the longitude, latitude of the location, a username. In some embodiments, the hash algorithm function SHA-256 may be used to generate the encryption keys in steps 108 and 127, which may lead to a number of $2^{256}$ possible combinations. Further, by setting the longitude and latitude decimal numbers to a precision of 5 in some embodiments, the user device may be able to distinguish an area within 1 meter or so in accuracy.

In an embodiment, the location coordinates are provided in the format of a sign, longitude decimal number, sign, latitude decimal number, along with username assumed at 12 characters. Oftentimes, the available characters for a password are upper case, lower case, number, and about ten special characters, resulting in 26+26+10+10=72 possible characters for a username. In an embodiment where the aforementioned variables are used, and a setting of number of possible hashes until a value is found that is less than the target 0x00000ffffffffffffffffffffffffffffffffffffffffffffffffffffffff, this particular equation may generate potential results in the form of:

$$2 \times 18000000 \times 2 \times 9000000 \times 72^{12} \times 2^{20} = 1.318757299 \times 10^{43} \text{ possibilities}$$

Even considering that earth is only 29% landmass, the potential encryption keys generated by user-selected locations may still contain at minimum:

$$((2 \times 18000000 \times 2 \times 9000000) \times 0.29) \times 72^{12} \times 2^{20} = 3.824396167 \times 10^{42} \text{ possibilities}$$

As such, location coordinates, together with a selected username are much more secure than standard passwords.

Figure 5:
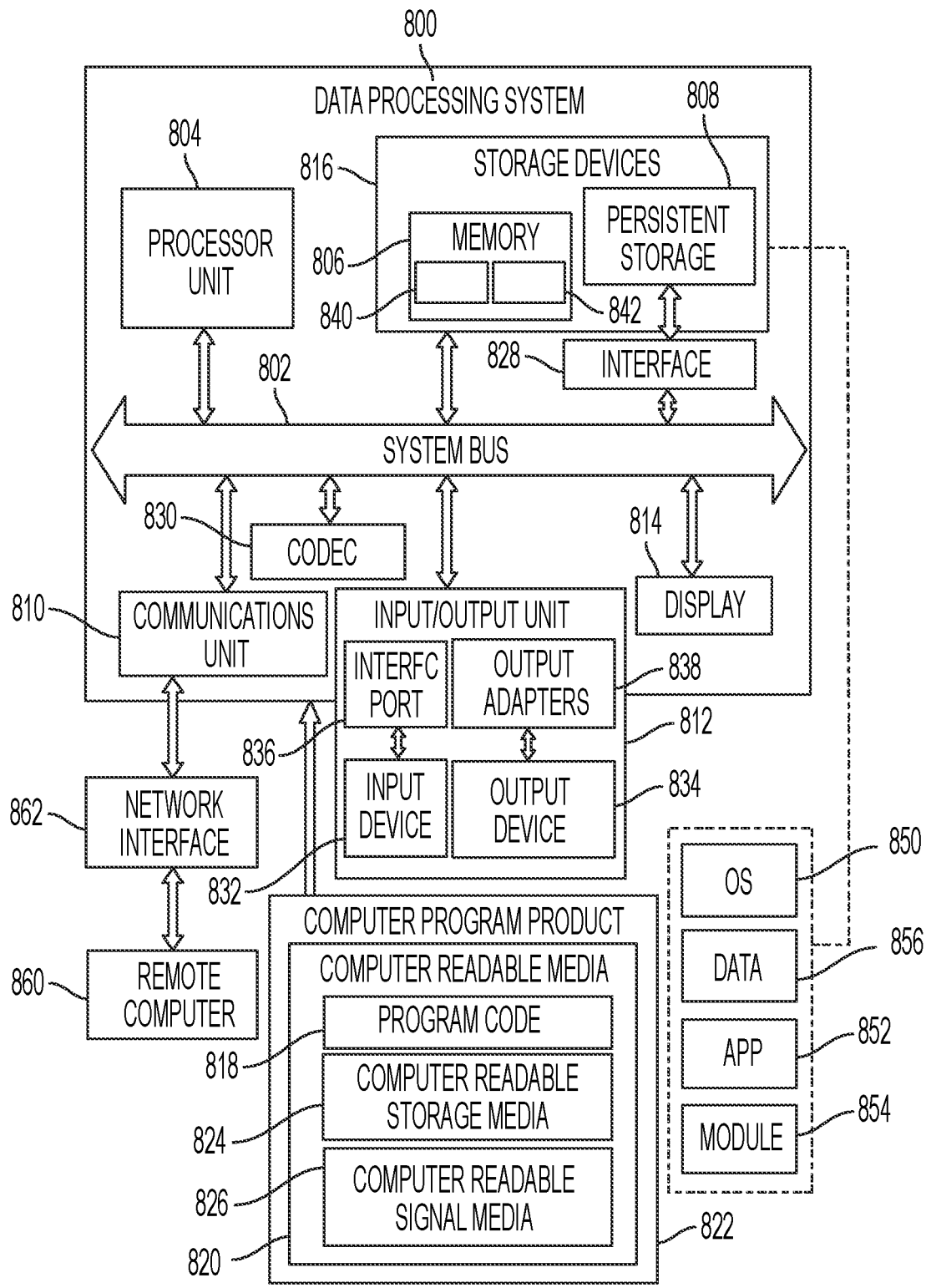
FIG. 5 is a schematic diagram of various components of an illustrative data processing system suitable for use with the aspects of the present disclosure.

As shown in FIG. 5, this example describes a data processing system 800 (also referred to as a computer and/or computing device) in accordance with aspects of the present disclosure. In this example, the data processing system 800 is an illustrative data processing system suitable for implementing aspects of the user device 50 and the computing device 60 as shown in FIG. 1. More specifically, in some examples, devices that are embodiments of data processing systems (e.g., smartphones, tablets, personal computers) may be used by users. Further, user devices that are embodiments of data processing systems (e.g., smartphones, tablets, personal computers) may be used as one or more server(s) and/or server devices in communication with one or more mobile communication devices.

In this illustrative example, data processing system 800 includes a system bus 802 (also referred to as communications framework). System bus 802 may provide communications between a processor unit 804 (also referred to as a processor or processors), a memory 806, a persistent storage

808, a communications unit 810, an input/output (I/O) unit 812, a codec 830, and/or a display 814. Memory 806, persistent storage 808, communications unit 810, input/output (I/O) unit 812, display 814, and codec 830 are examples of resources that may be accessible by processor unit 804 via system bus 802.

Processor unit 804 serves to run instructions that may be loaded into memory 806. Processor unit 804 may comprise a number of processors, a multi-processor core, and/or a particular type of processor or processors (e.g., a central processing unit (CPU), graphics processing unit (GPU), etc.), depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device may include any suitable hardware capable of storing information (e.g., digital information), such as data, programmable code in functional form, and/or other suitable information, either on a temporary basis or a permanent basis.

Storage devices 816 also may be referred to as computer-readable storage devices or computer-readable media. Memory 806 may include a volatile storage memory 840 and a non-volatile memory 842.

Persistent storage 808 may contain one or more components or devices. For example, persistent storage 808 may include one or more devices such as a hard disk drive, solid state disk, flash memory card, memory stick, and/or the like, or any combination of these. One or more of these devices may be removable and/or portable, e.g., a removable hard drive. To facilitate connection of the persistent storage devices 808 to system bus 802, a removable or non-removable interface is typically used, such as interface 828.

Input/output (I/O) unit 812 allows for input and output of data with other devices that may be connected to data processing system 800 (i.e., input devices and output devices). For example, input device 832 may include one or more pointing and/or information-input devices such as a keyboard, a mouse, touch pad or touch screen, microphone, game pad, and/or the like. These and other input devices may connect to processor unit 804 through system bus 802 via interface port(s) 836.

Output devices 834 may use some of the same types of ports, and in some cases the same actual ports, as input device(s) 832. For example, a USB port may be used to provide input to data processing system 800 and to output information from data processing system 800 to an output device 834. Output adapter 838 is provided to illustrate that there are some output devices 834 (e.g., monitors, among others) which require special adapters. Other devices and/or systems of devices may provide both input and output capabilities, such as remote computer(s) 860. Display 814 may include any suitable human-machine interface or other mechanism configured to display information to a user, e.g., a LED, or LCD monitor or screen, etc.

Communications unit 810 refers to any suitable hardware and/or software employed to provide for communications with other data processing systems or other devices. While communication unit 810 is shown inside data processing system 800, it may in some examples be at least partially external to data processing system 800. Communications unit 810 may include internal and external technologies, e.g., modems, ISDN adapters, and/or wired and wireless Ethernet cards, hubs, routers, etc. Data processing system 800 may operate in a networked environment, using logical connections to one or more remote computers 860. A remote computer(s) 860 may include a personal computer (PC), a server device, a router, a network PC, a workstation, a microprocessor-based appliance, a peer device, a smart phone, a tablet, another network note, and/or the like. Remote computer(s) 860 typically include many of the elements described relative to data processing system 800. Remote computer(s) 860 may be logically connected to data processing system 800 through a network interface 862 which is connected to data processing system 800 via communications unit 810. Network interface 862 encompasses wired and/or wireless communication networks, such as local-area networks (LAN), wide-area networks (WAN), and cellular networks.

Codec 830 may include an encoder, a decoder, or both, comprising hardware, software, or a combination of hardware and software. Codec 830 may include any suitable device and/or software configured to implement methods to encode and/or encrypt a data stream or signal for transmission and storage, and to decode the data stream or signal by decoding and/or decrypting the data stream or signal as shown in FIGS. 2-4. Although codec 830 is depicted as a separate component, codec 830 may be contained or implemented in memory, e.g., non-volatile memory 842.

Non-volatile memory 842 may include read only memory (ROM), programmable ROM (PROM), electrically programmable ROM (EPROM), electrically erasable programmable ROM (EEPROM), flash memory, and/or the like, or any combination of these. Volatile memory 840 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 816, which are in communication with processor unit 804 through system bus 802. In these illustrative examples, the instructions are in a functional form in persistent storage 808. These instructions may be loaded into memory 806 for execution by processor unit 804. Processes of one or more embodiments of the present disclosure may be performed by processor unit 804 using computer-implemented instructions, which may be located in a memory, such as memory 806.

These instructions are referred to as program instructions, program code, computer usable program code, or computer-readable program code executed by a processor in processor unit 804. The program code in the different embodiments may be embodied on different physical or computer-readable storage media, such as memory 806 or persistent storage 808. Program code 818 may be located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may comprise computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a non-transitory, physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is media that can be touched by a person.

Alternatively, program code 818 may be transferred to data processing system 800, e.g., remotely over a network, using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server or a server device to data processing system 800. The computer providing program code 818 may be a server computer, a client computer, or some other device capable of storing and transmitting program code 818.

In some examples, program code 18 may comprise be an operating system (OS) 850. Operating system 850, which may be stored on persistent storage 808, controls and allocates resources of data processing system 800. One or more applications 852 take advantage of the operating system's management of resources via program modules 854, and program data 856 stored on storage devices 816. OS 850 may include any suitable software system configured to manage and expose hardware resources of computer 800 for sharing and use by applications 852. In some examples, OS 850 provides application programming interfaces (APIs) that facilitate connection of different type of hardware and/or provide applications 852 access to hardware and OS services. In some examples, certain applications 852 may provide further services for use by other applications 852, e.g., as is the case with so-called "middleware." Aspects of present disclosure may be implemented with respect to various operating systems or combinations of operating systems.

The different components illustrated for data processing system 800 are not meant to provide architectural limitations to the manner in which different embodiments may be implemented. One or more embodiments of the present disclosure may be implemented in a data processing system that includes fewer components or includes components in addition to and/or in place of those illustrated for computer 800. Other components shown in FIG. 5 can be varied from the examples depicted. Different embodiments may be implemented using any hardware device or system capable of running program code. As one example, data processing system 800 may include organic components integrated with inorganic components and/or may be comprised entirely of organic components (excluding a human being). For example, a storage device may be comprised of an organic semiconductor.

In some examples, processor unit 804 may take the form of a hardware unit having hardware circuits that are specifically manufactured or configured for a particular use, or to produce a particular outcome or progress. This type of hardware may perform operations without needing program code 818 to be loaded into a memory from a storage device to be configured to perform the operations. For example, processor unit 804 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 818) may be implemented as hardware, e.g., by specifying an FPGA configuration using a hardware description language (HDL) and then using a resulting binary file to (re)configure the FPGA.

In another example, data processing system 800 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, system bus 802 may comprise one or more buses, such as a system bus or an input/output bus. Of course, the bus system may be implemented using any suitable type of architecture that provides for a transfer of data between different components or devices attached to the bus system. System bus 802 may include several types of bus structure(s) including memory bus or memory controller, a peripheral bus or external bus, and/or a local bus using any variety of available bus architectures.

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in system bus 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Figure 6:
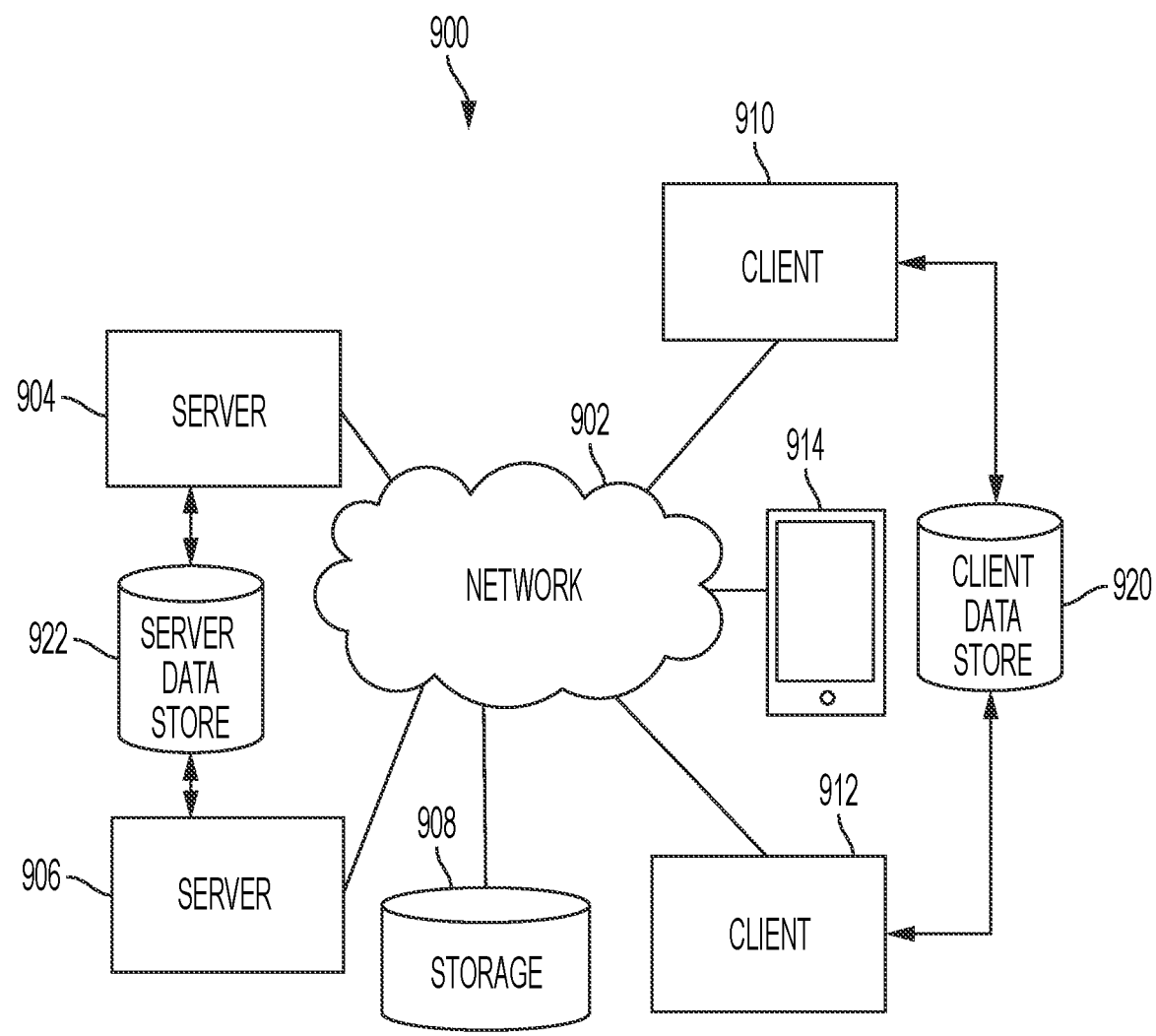
FIG. 6 is a schematic representation of an illustrative computer network suitable for use with aspects of the present disclosure.

As shown in FIG. 6, this example describes a general network data processing system 900, interchangeably termed a computer network, a network system, a distributed data processing system, or a distributed network, aspects of which may be included in one or more illustrative embodiments of the incident command system described herein. For example, computer network 30 is an example of a distributed data processing system such as system 900.

It should be appreciated that FIG. 6 is provided as an illustration of one implementation and is not intended to imply any limitation with regard to environments in which different embodiments may be implemented. Many modifications to the depicted environment may be made.

Network system 900 is a network of devices (e.g., computers and/or computing devices), each of which may be an example of data processing system 800, and other components. Network data processing system 900 may include network 902, which is a medium configured to provide communications links between various devices and computers connected within network data processing system 900. Network 902 may include connections such as wired or wireless communication links, fiber optic cables, and/or any other suitable medium for transmitting and/or communicating data between network devices, or any combination thereof.

In the depicted example, a first network device 904 and a second network device 906 connect to network 902, as do one or more computer-readable memories or storage devices 908. Network devices 904 and 906 are each examples of data processing system 800, described above. In the depicted example, devices 904 and 906 are shown as server computers, which are in communication with one or more server data store(s) 922 that may be employed to store information local to server computers 904 and 906, among others. However, network devices may include, without limitation, one or more user devices, personal computers, mobile computing devices such as tablets, smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 910 and 912 and/or a client smart device 914, may connect to network 902. Each of these devices is an example of data processing system 800, described above regarding FIG. 5. Client electronic devices 910, 912, and 914 may include, for example, one or more personal computers, network computers, and/or mobile computing devices such as smart phones, handheld gaming devices, wearable devices, and/or tablet computers, and the like. In the depicted example, server 904 provides information, such as boot files, operating system images, and applications to one or more client electronic devices 910, 912, and 914. Client electronic devices 910, 912, and 914 may be referred to as "clients" in the context of their relationship to a server such as server computer 904. Client devices may be in communication with one or more client data store(s) 920, which may be employed to store information local to the clients (e.g., cookie(s) and/or associated contextual information). Network data processing system 900 may include more or fewer servers and/or clients (or no servers or clients), as well as other devices not shown.

In some examples, first client electric device 910 may transfer an encoded file to server 904. Server 904 can store the file, decode the file, and/or transmit the file to second client electric device 912. In some examples, first client electric device 910 may transfer an uncompressed file to server 904 and server 904 may compress the file. In some examples, server 904 may encode text, audio, and/or video information, and transmit the information via network 902 to one or more clients.

Client smart device 914 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls over a cellular network, smartphones may be capable of sending and receiving emails, texts, and multimedia messages, accessing the Internet, and/or functioning as a web browser. Smart devices (e.g., smartphones) may also include features of other known electronic devices, such as a global positioning system. Smart devices may be capable of connecting with other smart devices, computers and/or computer devices, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 900 may be stored in or on a computer-readable storage medium, such as network-connected storage device 908 and/or a persistent storage 808 of one of the network computers, as described above, and may be downloaded to a data processing system or other device for use. For example, program code may be stored on a computer-readable storage medium on server computer 904 and downloaded to client 910 over network 902, for use on client 910. In some examples, client data store 920 and server data store 922 reside on one or more storage devices 908 and/or 808.

Network data processing system 900 may be implemented as one or more of different types of networks. For example, system 900 may include an intranet, a local area network (LAN), a wide area network (WAN), or a personal area network (PAN). In some examples, network data processing system 900 includes the Internet, with network 902 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. In some examples, network 902 may be referred to as a "cloud." In those examples, each server 904 may be referred to as a cloud computing node, and client electronic devices may be referred to as cloud consumers, or the like. FIG. 6 is intended as an example, and not as an architectural limitation for any illustrative embodiments.

Example Features: This section describes additional aspects and features of the method and system of password recovery using a selected location, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing, without limitation, examples of some of the suitable combinations.

A. A system for generating and recovering private keys, the system comprising:

A server device;

A user device;

A processor in communication with the user device, wherein the processor:

obtains a first location information from the user device;

generates a header data comprising a username and the first location information;

uses the header data to compute and generate a first private key, comprising using a first cryptographic hash to generate a first encryption key, and using a second cryptographic hash to generate a first relationship identifier;

obtains the username to verify a transaction request from the user device; and verifies the transaction request by computing a second private key, wherein the private key is generated by using a second location information, comprising using a third cryptographic hash to generate a second encryption key, and using a fourth cryptographic hash to generate a second relationship identifier.

A1. The system of paragraph A, wherein the first cryptographic hash is followed by an obfuscation hash to create the first encryption key, and the second cryptographic hash is followed by an obfuscation hash to create the first relationship identifier.

A2. The system of paragraph A1, wherein the third cryptographic hash is followed by an obfuscation hash to create the second encryption key, and the fourth cryptographic hash is followed by an obfuscation hash to create the second relationship identifier.

A3. The system of paragraph A2, wherein the processor verifies the transaction request from the user device by comparing the generated second relationship identifier to the first relationship identifier stored in the server device, and determining that the two relationship identifiers match each other.

A4. The system of paragraph A1, wherein the processor generates the first and second encryption keys and relationship identifiers using a one-way hash function.

B. A method for generating and recovering private keys, the method comprising:

Obtaining a first location information;

Generating a header data from the first location information and a username;

Generating a first private key, comprising using the header data to conduct a first cryptographic hash to generate a first encryption key, and using the encryption key to conduct a second cryptographic hash to generate a first relationship identifier;

Computing a second private key, comprising obtaining a second location to conduct a third cryptographic hash to generate a second encryption key, and using the encryption key to conduct a fourth cryptographic hash to generate a second relationship identifier; and Comparing the first relationship identifier with the second relationship identifier.

B1. The method of paragraph B, further comprising using an additional obfuscation hash after the first, second, third and fourth cryptographic hashes.

B2. The method of paragraph B1, further comprising determining the first relationship identifier matches the second relationship identifier; and after determining that a match exists between the two relationship identifiers, making a verification decision and applying a decryption function using the first or second encryption key.

B3. The method of paragraph B2, wherein generating the first and second encryption keys and relationship identifiers comprises using a one-way hash function.

It will be appreciated that the invention is not restricted to the particular embodiment that has been described, and that variations may be made therein without departing from the scope of the invention as defined in the appending claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A method for generating and recovering private keys based on encryption and decryption of a user's location information, the method comprising:

obtaining first location information from a first user device;

generating first header data from a computing device, the first header data including part of the first location information and a username;

generating a first private key from the computing device, the generating step including applying a first cryptographic hash function to the first header data to generate a first encryption key, and applying a second cryptographic hash function to the encryption key to generate a first relationship identifier;

sending the first relationship identifier to a server device for storage;

obtaining second location information from a second user device;

generating second header data from the computing device, the second header data including part of the second location information and the username;

computing a second private key from the computing device, the computing step including applying a third cryptographic hash function to the second header data to generate a second encryption key, and applying a fourth cryptographic hash function to the second encryption key to generate a second relationship identifier;

retrieving the first relationship identifier from the server device; and comparing the first relationship identifier with the second relationship identifier.

2. The method of claim 1, wherein applying the first, second, third, and fourth cryptographic hash functions further comprises the computing device:

setting a desired value as a parameter;
performing a one-way cryptographic hash function repeatedly;
calculating the value of a resulting cryptographic hash; and
stopping repetition of the performing step when the calculated value of the resulting cryptographic hash is below the desired value.

3. The method of claim 2, further comprising the computing device performing an obfuscation hash function after conducting the first, second, third and fourth cryptographic hash functions to generate the first encryption key, the first relationship identifier, the second encryption key, and the second relationship identifier.

4. The method of claim 3, wherein comparing the first relationship identifier with the second relationship identifier further comprises the computing device:
receiving the first relationship identifier from the server device;
comparing the first relationship identifier with the second relationship identifier; and
determining whether the first and second relationship identifiers match each other.

5. The method of claim 4, in response to determining that the first and second relationship identifiers match each other, further comprises the computing device:
applying a decryption function to the first and second relationship identifiers;
applying a decryption function using the first and second encryption keys; and
transmitting to the second user device a recovered private key.

6. The method of claim 1, wherein applying the first, second, third, and fourth cryptographic hash functions comprises applying one or more one-way hash functions.

7. The method of claim 6, further comprising the computing device transmitting the first encryption key and the first relationship identifier to a server device or a server for storage.

8. The method of claim 7, wherein only a portion of the first encryption key and the first relationship identifier is stored.

9. The method of claim 1, wherein the first and second location information are geographic coordinates.

10. The method of claim 1, wherein the first user device is the same as the second user device.

11. The method of claim 1, wherein the first user device and the computing device are integrated into a singular device.

12. A system for generating and recovering private keys, the system comprising:
a server device;
a user device;
a computing device comprising a processor in communication with the user device, memory coupled to the processor having stored therein instructions that, when executed, will cause the processor to:
obtain first location information from the user device;
generate first header data comprising a username and the first location information;
use the first header data to compute and generate a first private key, the use step comprising applying a first cryptographic hash function to generate a first encryption key, and applying a second cryptographic hash function to generate a first relationship identifier;
transmit the first relationship identifier to the server device;
obtain the username to verify a transaction request from the user device; and
verify the transaction request by computing a second private key, wherein the second private key is generated by using second location information, the verify step comprising applying a third cryptographic hash function to generate a second encryption key, and applying a fourth cryptographic hash function to generate a second relationship identifier.

13. The system of claim 12, wherein the stored instructions, when executed, will further cause the processor to perform an obfuscation hash after conducting the first, second, third and fourth cryptographic hash functions.

14. The system of claim 13, wherein the stored instructions, when executed, will further cause the processor to:
verify the transaction request from the user device by comparing the second relationship identifier with the first relationship identifier stored in the server device; and
determine whether the first and second relationship identifiers match each other.

15. The system of claim 14, wherein the first, second, third, and fourth cryptographic hash functions applied by the processor, when the stored executions are executed, are one-way hash functions.

16. The system of claim 15, wherein applying the first, second, third, and fourth cryptographic hash functions comprises:
setting a desired value as a parameter;
performing a one-way cryptographic hash function repeatedly;
calculating the value of a resulting cryptographic hash; and
stopping repetition of the performing step when the calculated value of the resulting cryptographic hash is below the desired value.

17. The system of claim 16, wherein the first, second, third, and fourth cryptographic hash functions are the algorithm function SHA-256.

* * * * *